J. W. GRANT.
PAPER FASTENER.
APPLICATION FILED SEPT. 10, 1920.
Reissued Nov. 2, 1920. 14,974.
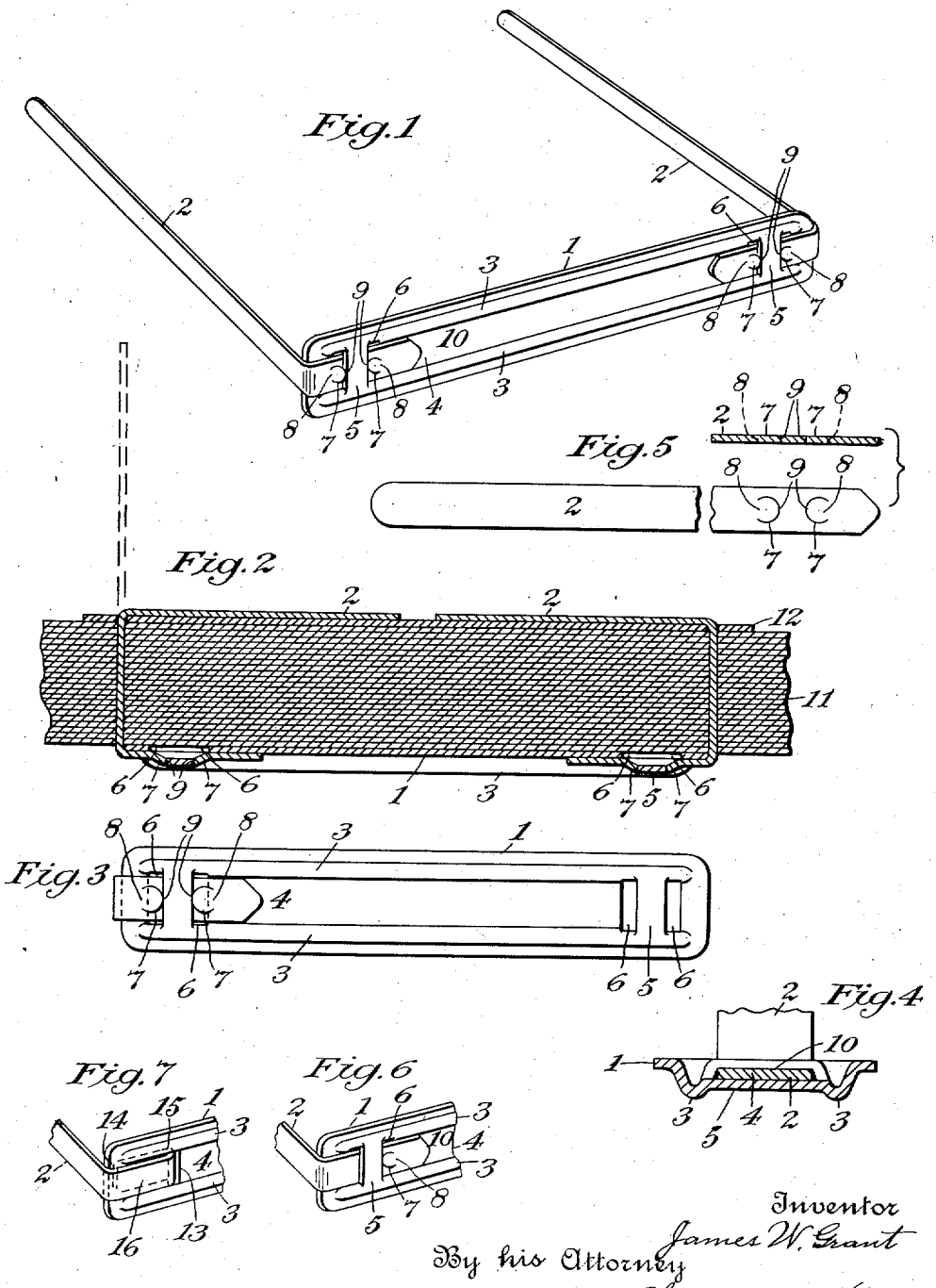
Inventor
James W. Grant
By his Attorney
Charles D. King.

UNITED STATES PATENT OFFICE.

JAMES W. GRANT, OF BRIDGEPORT, CONNECTICUT, ASSIGNOR TO FRED J. KLEIN, OF LONG ISLAND CITY, NEW YORK.

PAPER-FASTENER.

14,974. Specification of Reissued Letters Patent. Reissued Nov. 2, 1920.

Original application filed September 26, 1916, Serial No. 122,199. Renewed September 22, 1919, Serial No. 325,525. Original No. 1,337,598, dated April 20, 1920. Application for reissue filed September 10, 1920. Serial No. 409,479.

*To all whom it may concern:*

Be it known that I, JAMES W. GRANT, a citizen of the United States, and a resident of Bridgeport, in the county of Fairfield and State of Connecticut, have invented certain new and useful Improvements in Paper-Fasteners, of which the following is a specification.

This invention relates to fasteners for filing papers, such as letters, documents and the like, and more especially to that type of fastener which consists of a base portion and two tongues adapted to be pushed through the papers to be filed and then bent down flat against the papers.

The main object of the invention is to provide a paper fastener of this class, which shall be adapted for forming files of greatly varying thickness by the use of but a few sizes of fasteners or fastener parts. Another object is to provide a fastener especially adapted to be manufactured in large quantities at small expense, and still another object is to provide fasteners especially adapted to be packed in small compass, so as to minimize expense for boxes and packages.

The means I employ to accomplish the above objects are illustrated in the accompanying drawing, in which, Figure 1 is a perspective view of one of my improved paper fasteners.

Fig. 2 is a longitudinal section showing such a fastener applied to a file of papers.

Fig. 3 is a plan of the bottom of the fastener with one tongue removed.

Fig. 4 is a transverse section of my improved fastener on a line through the transverse bar on the base.

Fig. 5 is a detail of one of the tongue members.

Fig. 6 is a perspective view of a modified form of my invention.

Fig. 7 is a perspective view of another modification.

Like characters refer to like parts in all figures of the drawing.

My improved paper fastener illustrated in the drawing consists of a rectangular base member 1 of sheet metal, and two detachable tongue members 2, which are somewhat narrower than the base, and preferably of a more pliable grade of sheet metal than the base member.

The base member 1 has two longitudinal parallel ridges 3, forming a groove 4 between them of substantially the same width as the tongue members, the said ridges and groove, together with the other portions of the base member being preferably made of a single piece of sheet metal, and having all of the parts integral. Near each end of the base is provided a band or bar such as 5, which forms a connection between the ridges. On each side of the band or bar are openings or slots such as 6 in the base member for a purpose hereinafter to be described.

The tongue members 2 are provided near each end with stamped lugs 7 preferably rounded, each of which is connected to the body of its respective tongue member by portions 8. The outlines of the lugs 7 are stamped clear through the metal except at the portions 8, but said lugs 7 remain flat in the tongue member without being bent out of the plane of the same, until said tongue member is inserted in the base member. Their tips 9 are spaced apart a distance equal to the width of a band or bar 5.

The fasteners are assembled by inserting a tongue 2 in the groove 4 near the end of the base 1, and passing it between the band or bar 5 and the flat surface 10 of the base until the tips 9 of the lugs 8 are in line with the edges of the band or bar 5 at that end. The lugs 7 are both pressed down by inserting a suitable implement through the openings or slots 7, causing the lugs to project and engage the band or bar 5, locking the tongue to the base. The second tongue is secured to the other end of the base, and the free ends of the tongues are swung around, bending them over the ends of the base, and bringing them at right angles thereto. The fastener can then be used for filing by passing the tongues 2 through the papers as far as they will go, and then bending the ends flat on the topmost paper, or on top of a washer if one is used. This is illustrated in Fig. 2, where the papers are indicated by the numeral 11 and the washer by 12. By employing tongues of different lengths files of various thickness can be formed, corresponding to the lengths of the tongues employed.

In the form of my invention illustrated in Fig. 6, the base member is the same in all respects as the base described in the foregoing, but the tongue members 2 are each provided with only one lug 7, which is formed to engage with the inner edges only, of the transverse bands or bars 5. The said tongue members are assembled as described above, except that only one lug 7 in each is present to be bent down and form a projection. The final securing of the tongue is effected when the same is bent over the end of the base at right angles to the same.

In the form of my invention illustrated in Fig. 7, I have provided a single transverse slot 13 in the base member 1, which has ridges 3 and a groove 4 between them. I pass the inner end 14 of the tongue member 2, through the slot 13, bending the tongue at 15 around into the groove 4, then bend it around the end of the base 1, alining the portion 16 by the groove 4.

Of the paper fasteners now in use, there is one sort that consists of a rectangular base, and a long tongue member passed through two slots in the base near the ends and which is then bent around each end at right angles, forming a tongue at each end of the base. Another form consists of a rectangular base with a tongue at each end, integral with the base. In my present invention I have improved over both these forms by effecting an economy of material, and in other ways. Compared with the first mentioned form I am able to produce a given number of fasteners with less tongue material. Compared with the second, I am able to produce a given number of fasteners with less scrap in the stamping operations. Again in comparison with the second form, a smaller number of dies is required to make as many sizes of fasteners as are required. My improved fasteners are packed for sale in boxes without assembling the tongue members on the bases, so that I am able to pack a maximum number of parts in a box or package as will be noted on comparing with the fasteners now on the market.

I claim:

1. A three piece paper fastener comprising a base member, and two tongue members, spaced apart, one near each end of the base member, separate therefrom and from each other, each tongue member positively secured near its own end to the respective end portion of the base member, and alined by one of its side edges with an alining edge on the base member.

2. A three piece paper fastener comprising a base member, and two separate tongue members, spaced apart and positively secured to the base member, one near each end, each end portion of said base member embodying two edges for alining the tongue member by its two side edges, and each tongue member embodying means to complete the securing and alining of the respective tongue member to the base member.

3. A paper fastener comprising a base member embodying two transverse bands or bars and two separable tongue members, one fastened to each band or bar.

4. A paper fastener comprising a base member embodying a band or bar near each end, and two separable tongue members, separate from each other, one for each end of the base, each tongue member having means for securing it to one of said bands or bars.

5. A paper fastener comprising a base embodying two transverse bars one near each end, and two tongues separate from each other, spaced apart, one near each end of the base, one end of each tongue positively secured to and interlocking with the respective bar of the base.

6. A paper fastener comprising a base embodying an integral transverse bar near each end, and two tongues on said base separate from each other, spaced apart, one near each end of the base, each secured to one of said bars by lugs on the respective tongues.

7. A paper fastener comprising a base having a longitudinal groove, and two tongues separate from each other and spaced apart, each fastened to a separate end of the base, and alined by the groove, and also adapted to be bent over the end of the base at right angles thereto.

8. A paper fastener comprising a rectangular base having longitudinal ridges, two separable tongues separate from each other, means for securing one of the tongues near one end of the base and alining it by said ridges, and means for securing the other tongue near the other end of the base, and also alining it by said ridges.

9. A paper fastener comprising a base having a longitudinal groove extending to or nearly to the ends of the base, two separable tongues, one for each end of the base, fastening means on each of said tongues, and means at each end of the base coöperating with the fastening means on the tongue for securing the respective tongue end on the base in the said longitudinal groove thereof.

10. A paper fastener comprising a base having two longitudinal ridges and a longitudinal groove between said ridges and also having a transverse band or bar near each end between said ridges, two separable tongues, one for each end of said base, and each having its end held in the longitudinal groove, between the transverse band or bar and the surface of the groove, and means on each tongue for securing it to its respective band.

11. A paper fastener comprising a base longitudinally grooved, having a band or bar near each end, and two tongues separate from each other and spaced apart each secured to a separate one of the bands, alined by the groove, and bent over the ends of the base at right angles thereto.

12. A paper fastener comprising a base longitudinally grooved having a band or bar near each end, two tongues separate from each other and spaced apart, one near each end of the base, alined by the groove, and bent over the ends of the base at right angles thereto, and means on each tongue to secure it to its respective band on said base.

13. A paper fastener comprising a base having two raised bands or bars, and two separable tongues adapted to be passed between said bars and the body of the base, and each embodying a lug adapted to be pushed out and make contact with the edges of a bar for securing the tongue.

14. A paper fastener comprising a base embodying two integral raised bars, each bar having a perforation on each side, and two separable tongues, one secured to each bar and bent over the adjacent end of the base, at right angles to the said base, each tongue having two integral lugs to engage with said bars.

15. A paper fastener comprising a base embodying two parallel, integral longitudinal ridges forming a longitudinal groove and two transverse, integral bars connecting said ridges, each bar having a perforation each side thereof, and two separable tongues, alined by said ridges, one tongue held by each of said transverse bars, and each tongue bent over the adjacent end of the base, at right angles thereto, each tongue having a lug to engage with said bars.

Signed at Bridgeport in the county of Fairfield and State of Connecticut this 14th day of August, A. D. 1920.

JAMES W. GRANT.